Figure 1:
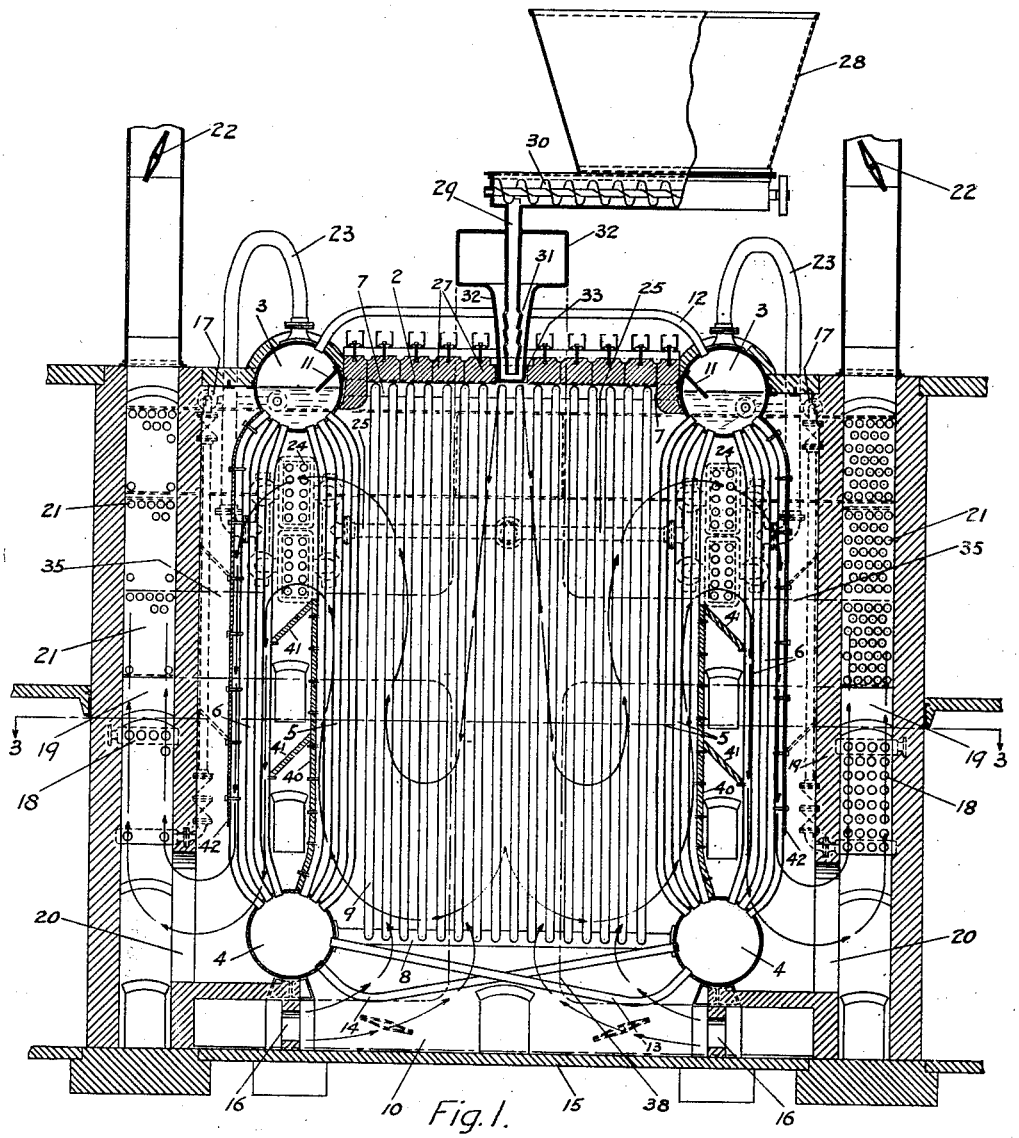

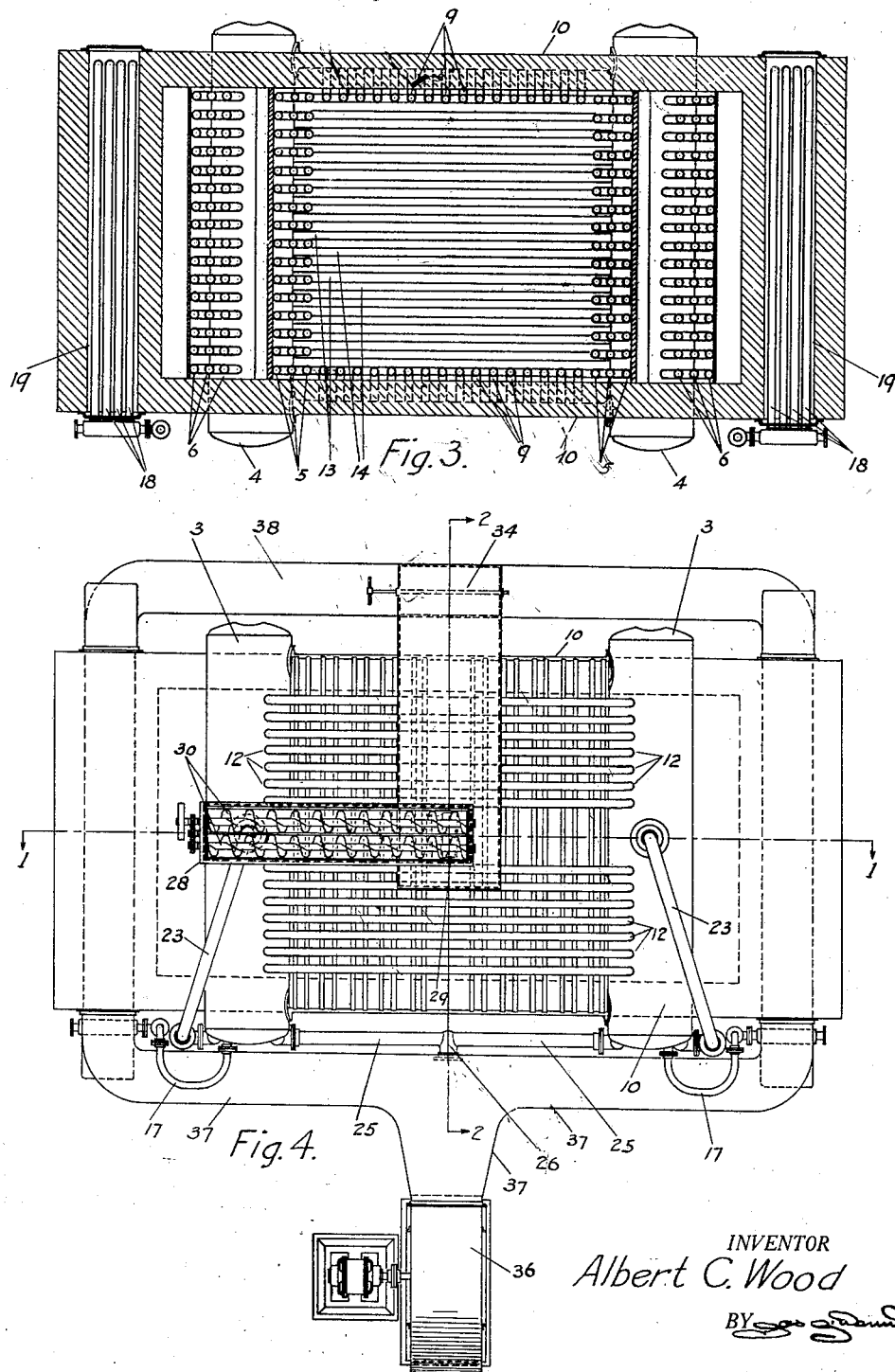

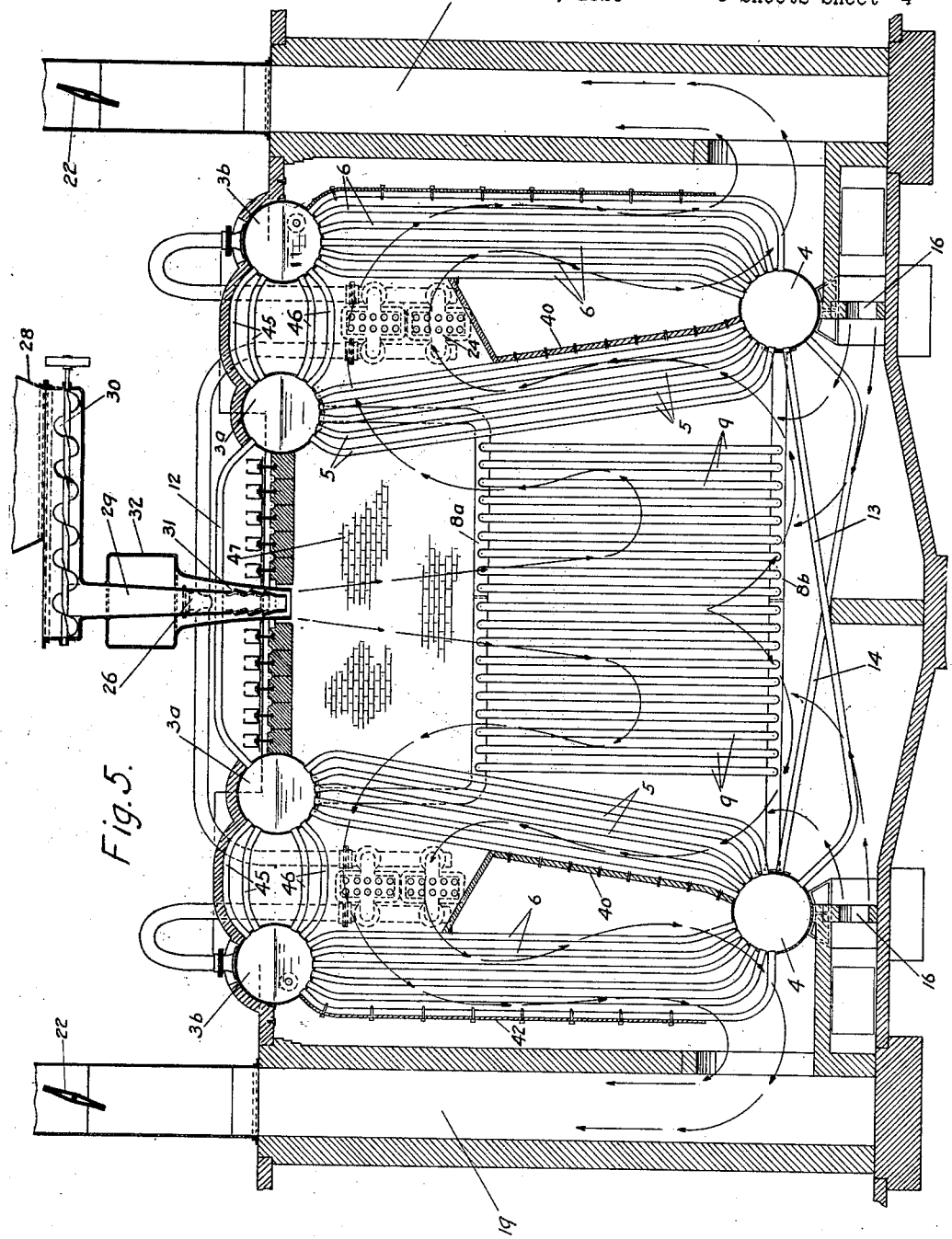

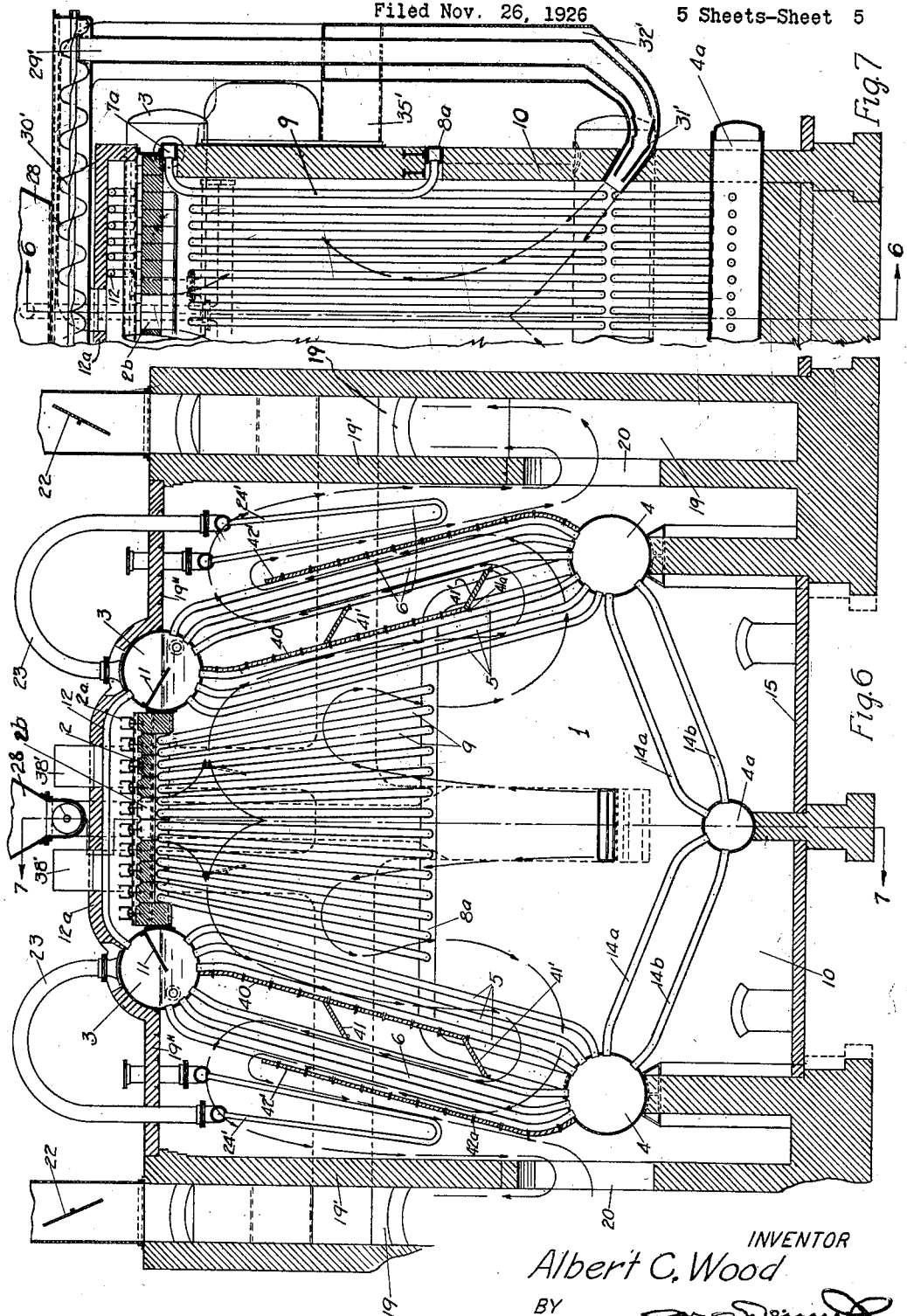

Patented Nov. 3, 1931

1,830,155

UNITED STATES PATENT OFFICE

ALBERT C. WOOD, OF PHILADELPHIA, PENNSYLVANIA

ART OF GENERATING STEAM

Application filed November 26, 1926. Serial No. 150,665.

My invention is an improved steam generator adapted primarily for the utilization of fuels which are combustible in suspension and produce intense heat insuring quick and efficient generation of steam from water which is rapidly and naturally circulated through circulating tubes affording to the furnace walls or settings complete or partial protection from the high temperatures of the furnace and reducing to a minimum the losses due to radiation.

In accordance with my invention, the combustion space of a unitary or integral boiler and furnace is formed between nests of tubes comprised in primary generating elements located substantially symmetrically on opposite sides of the longitudinal center line of the apparatus, and the end walls of the furnace are completely or partially protected by screens or curtains of circulating tubes forming secondary generating elements constituting an integral part of the boiler and so connected therewith through headers as to induce natural and rapid circulation upward of water. The primary generating elements are flanked by vertical flues containing heat absorptive economizing devices separated from the primary generating nests by flue walls which are protected against deterioration by the heat absorption of such tube nests and economizing devices.

A stream of heated air and fuel combustible in suspension is injected preferably through the upper part of the furnace into the combustion chamber between the banks of generating tubes and heated gases are evolved from such stream by combustion. The combustible stream is discharged downwardly with considerable velocity but near the bottom of the combustion chamber the fuel stream with the gases evolved therefrom divides or spreads and flows reversely upward around the central descending stream or column and along the primary and secondary generating tubes; the upflowing flame volume or heated gases encompassing or flanking and maintaining the ignition of the central downflowing fuel stream by radiant heat and intimate contact and effecting rapid vaporization of the fluid in the generating elements. The reversal of the course of the gases adjacent to the bottom of the combustion chamber promotes the deposition of ash therefrom in discrete particles and avoids or minimizes the fusion of the ash on heat absorptive generating surfaces.

The downward flow of the central stream or column and the upward flow of the outer stream or columns are accelerated by the relative weight of the several columns since the central column is relatively much colder and heavier than the intensely hot and largely expanded outer column. Additional supplies of heated air may be admitted under control at the bottom of the combustion chamber to intensify the furnace action and accelerate the upward flow. The ignition of the descending column of fuel and air by the heat from the ascending flaming gases on either side of the furnace obviates the necessity for any considerable areas of refractory lining for the maintenance of combustion.

The hearth or bottom wall of the setting is preferably protected from the effects of the heat of the products of combustion not only by the admission of auxiliary air adjacent thereto and the upward diversion of the burning gases but also by the provision of oppositely inclined sets of circulating tubes communicating with drums or headers at the bases of the primary generating elements. Definite and rapid circulation through these tubes results from the fact that the lower portions of the tubes are further from the fire, are shielded partially by the upper portions of the oppositely inclined tubes, and the lower portions of the tubes are exposed to and cooled by the auxiliary air admitted to the lower part of the furnace; consequently these tubes not only afford protection to the hearth but generate steam and equalize the water level between the boiler elements on the opposite side of the furnace.

The main tube nests and baffles are substantially upright and hence preclude the accumulation of material amounts of dust and dirt and the adhesion of fused ash deposits. The baffles required are simple and rugged and not easily dislodged. The cost of settings and refractory linings are greatly reduced, space economized, efficiency increased and maintenance costs reduced by my improved assembly and relationship of the several elements and the movements of the fuel, air, products of combustion, water and steam induced thereby.

The characteristic features and advantages of my improvements will more fully appear from the following description and the accompanying drawings of illustrative and preferred embodiments thereof.

Figure 2:
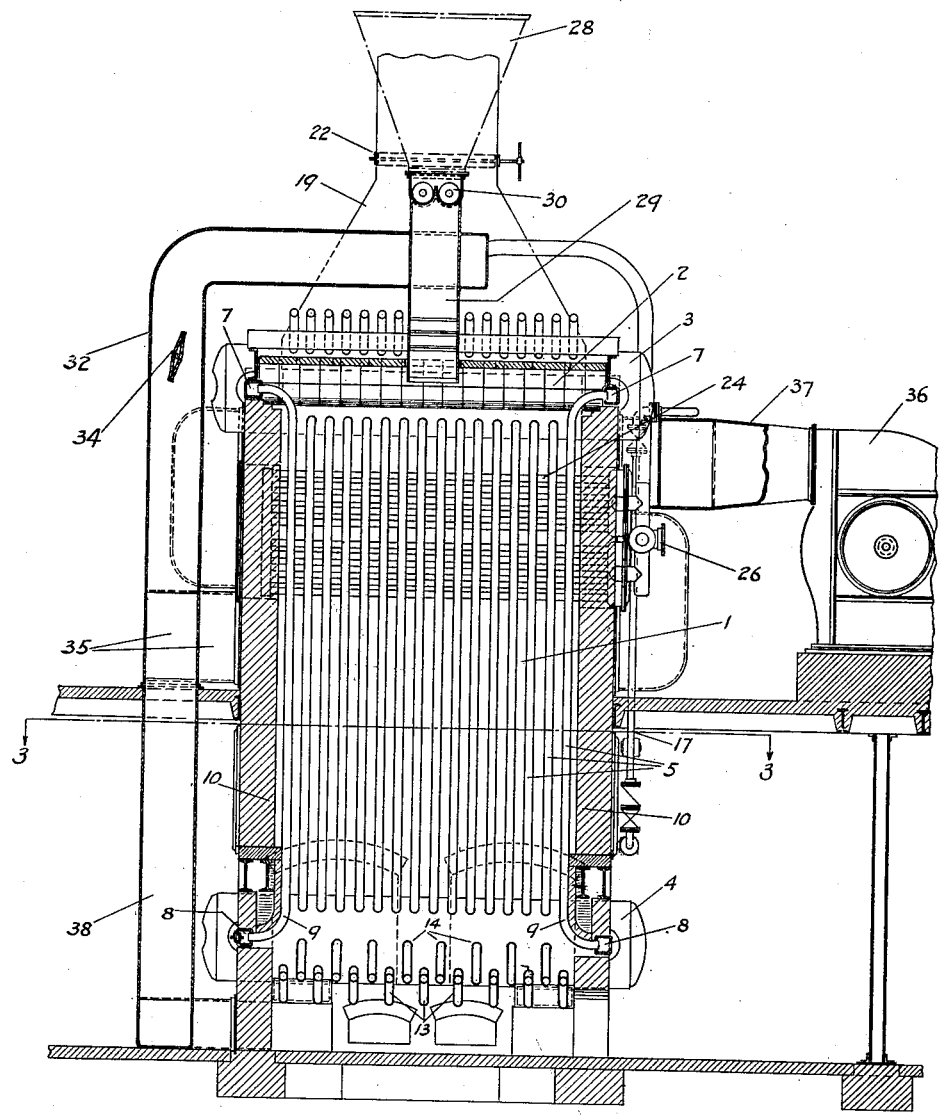

In the drawings, Fig. 1 is a vertical sectional view taken on the line 1—1 of Fig. 4 of a steam generator embodying my improvements; a portion of the structure cut away by the section being projected by dot and dash lines; Fig. 2 is a vertical sectional view of the same generator taken on the line 2—2 of Fig. 4; Fig. 3 is a horizontal sectional view taken on the line 3—3 of Figs. 1 and 2; Fig. 4 is a top plan view of the generator shown in the preceding figures; Fig. 5 is a vertical sectional view of a modified embodiment of my invention; Fig. 6 is a vertical sectional view of a further modification of my invention, while Fig. 7 is a vertical sectional view taken on the line 7—7 of Fig. 6, this figure being a sectional development on median line 6—6 of Fig. 7, the part to the left of this line in Fig. 7 being omitted from this figure, since it is substantially symmetrical with that shown.

As illustrated in Figs. 1 to 4 inclusive of the drawings, the primary generating elements are arranged substantially symmetrically on opposite sides of a combustion chamber 1 in the boiler setting 2; each primary generating element comprising an upper drum 3, a lower drum 4, a bank of upright upflow tubes 5 and a bank of upright downflow tubes 6. The primary generating elements have connected with opposite ends of the drums thereof wall protecting elements comprising headers 7 connecting the drums 3, headers 8 connecting the drums 4, and screens or curtains of tubes 9 connecting the respective pairs of headers 7 and 8 to shield or curtain the end walls 10 of the furnace. The headers 7 preferably communicate with the drums 3 below the normal water level thereof and behind the shields 11, and the steam spaces of the drums 3 are preferably connected by a row of insulated equalizer tubes 12 lying above the refractory top wall or roof of the furnace. The radiation from this refractory roof aids combustion.

The drums 4 are connected by rows of oppositely inclined tubes 13 and 14 which cross one another above the approximate center of the hearth or bottom wall 15, which is protected by the heat absorptive capacity of the tubes. The upper or outlet ends of the tubes 13 and 14 are connected to the respective drums 4 adjacent to the plane of connection therewith of the headers 8 and extend radially from the drums to points beyond their line of intersection. The tubes are there bent in a curve so that their lower or inlet ends make radial connections with the drums below the level of the outlets from the complementary row of tubes and the headers 8. Definite and rapid circulation through the tubes 13 and 14 is assured since the lower portions of the tubes are farther from the fire than the upper portions of the tubes, the lower portions of each row of tubes is partially shielded by the upper portions of the other row of tubes, and the lower portions of the tubes are directly exposed to the cooling effect of air supplied through ports 16 below the respective drums.

Water is supplied to the respective drums 3 through valve controlled tubes 17 from economizers 18 located in substantially vertical flues 19 at the sides of the combustion chamber. The gases from the combustion chamber enter the flues 19 through the openings 20 and pass through the flues on their way to the stack or other draft producing means. The flues may also have therein air preheater tubes 21 or superheater tubes or both, and may be controlled by dampers 22.

The steam collecting drums 3 may be connected through tubes 23 with superheaters 24 which are shown positioned between the tube banks 5 and 6 of the primary generating elements, but which, may be elsewhere located, as for instance in the lower part of the flues 19. The superheaters communicate through the tubes 25 with the common superheated steam outlet 26.

Fuel combustible in suspension, such as powdered coal, sawdust, liquid, or gas is introduced into the combustion chamber through the top 27 of the furnace substantially midway between the primary generating elements 5 and 6.

As illustrated, pulverized fuel is fed from a hopper 28 supported above the furnace to a fuel supply pipe 29 by power driven screw conveyors 30. The tube 29 contains air ports 31 for the admission of air for admixture with the fuel in its passage through the supply pipe which is partly housed within a heated air supply conduit 32, which together with the fuel supply pipe discharges to the top of the combustion chamber through an opening 33 in the roof of the furnace. The conduit 32 is supplied with heated air, under control of a damper 34, from a main 35 communicating with the air preheaters 21 to which air is supplied under pressure by a blower 36 through the conduit 37. The heated air main 35 also supplies preheated air through damper controlled branches of a conduit 38 to the air ports 16 beneath the drums 4.

The upright tubes 5 have fixed thereto baffles comprising plates 40 and deflectors 41 inclined downwardly toward the upright tubes 6, which are preferably provided with baffle plates 42 to cooperate with the plates 40 and deflectors 41 in concentrating the heated gases on the tubes 6. The baffles 40, 41 extend upwardly from the drums 4 to points below the level of the drums 3 and the baffles 42 extend downward from the drums 3 to points above the level of the drums 4. The substantially vertical or upright disposition of the main tube nests and baffles reduces to a minimum the accumulation thereon of dust and dirt and the adhesion thereto of fused particles of ash.

In operation, fuel and heated air are discharged downwardly under some pressure and with considerable velocity into the combustion chamber where the relatively cool column of combustible matter is ignited primarily by the radiant heat and flame of the intensely hot and largely expanded ascending columns rising around the downflowing column. The downward flow of the central column and the upward flow of the outer column is accelerated by the differences in their relative weights. The descending column upon its ignition and expansion divides and flows upwardly along the tubes 5 and 9, the combustion being intensified and the flow accelerated by the admission of heated air under pressure through the ports 16. The products of combustion rising along the tubes 5 sweep over the tops of the baffles 40 and over the superheaters 24 and are deflected downwardly over the tubes 6, from which they pass to the flues 19 where further heat is absorbed by the economizing devices 18 and 21 before discharge to the stack.

By my improvements there is provided a compact structure in which the radiant heat losses and the ill effects of air infiltration are reduced to a minimum and the cost of settings, and refractory linings are very greatly reduced. The generator is operable efficiently at high working temperatures without serious deterioration, since the side walls 19' are banked and shielded on one side by the primary boiler elements 5, 6, and on the other side by the secondary elements 18 and 21 designed to absorb heat from gases of lower temperature: the end walls are protected by the curtain or screen formed by the tubes 9 so connected as to induce natural and rapid circulation upwardly therethrough; the hearth is protected by the intersecting tubes 13 and 14 and the admission of air through the openings 16, and the refractory roof is protected by the cooling effect of the admission of the fuel and air and the diversion laterally of the upflowing heated gases at the sides.

Fig. 5 illustrates an adaptation or modification of the generator shown in the previous figures and which while generally similar thereto is designed primarily for the utilization of fuels which require concentrated intense heat for ignition and for the absorption of greater portions of the heat from the products of combustion before discharge thereof to the flues than would be absorbed in a generator of the type illustrated in Figs. 1 to 4. Hence in this modified construction while economizer devices may be placed in the flues, the generator may be efficiently operated without them.

In the modified construction, tubes 5 are slightly inclined and a larger number of tubes 5 and 6 are used in each primary generating nest. The lower ends of the tube banks of each nest are connected to a drum 4 as before, but the upper ends of the respective banks 5 are connected with the respective drums 3a while the upper ends of the respective banks 6 are connected with the respective drums 3b. Each drum 3a is connected with a drum 3b by tubes 45 and 46 to equalize pressures and provide for circulation between them. The drums 3a are connected with one another by the tubes 12 and by a sectional top header 8a having legs depending from the drums and connected by a median length substantially below the level of the drums. The tubes 9 are connected to the bottom sectional header 8b and with the median portion of the upper sectional header 8a so as to leave above said last named header exposed end wall sections 47 of refractory material, which become highly heated and facilitate ignition of the fuel supplied through the roof of the furnace. The deflectors at the tops of the baffles 40 are inclined upwardly toward the tubes 6. When boilers are constructed of considerable width, as shown in this figure, it is sometimes desirable to support the tubes 13 and 14 intermediate their lengths by a partition or wall 48, which also aids in separating and deflecting upwardly the air currents admitted through inlets such as 16, or through air inlets at the ends of the furnace.

Figs. 6 and 7 illustrate a further adaptation or modification of the generator shown in the previous figures, which, while generally similar thereto, is intended for effecting combustion of the fuel by discharging it, with a suitable initial air supply, upwardly within the combustion chamber, and intermediate the primary generating elements on either side, in such a way, and by such means, that the burning gases evolved from the fuel are caused to divide beneath the roof of the combustion chamber and to flow downwardly on either side of the upwardly ascending fuel and air column; the radiant heat and flame of the intensely hot downflowing columns assisting and accelerating the ignition of the upflowing column. In this form of my invention, the secondary air supply for completing combustion is preferably admitted at the top of the combustion chamber, the air so admitted serving to cool the roof of the combustion chamber and to reverse the flow of the gases thereunder.

In the modified construction shown in Figs. 6 and 7, the tube banks 5 and 6, constituting the primary generating elements, are connected to drums 3 and 4, as in Fig. 1. The tube banks on either side of the combustion chamber 1 are, however, in the modified form, preferably inclined toward each other so that the distance between drums 3 is less than the distance between drums 4. The end walls are water cooled, in the upper portions at least, by water circulating tubes 9, connecting between headers 7a and 8a, in turn connecting, respectively, with drums 3 and 4 on either side of the combustion chamber 1. Hearth protecting tubes 14a and 14b connect the drums 4 with the drum 4a, located below and midway between the drums 4. Tubes 12 connect the steam spaces of drums 3, one with the other. An air tight roof, 12a, encloses the tubes 12, below, which is the combustion chamber roof 2, preferably constructed with refractory blocks suspended from beams 2a. An opening 2b is provided in the combustion chamber roof for admitting secondary or supplementary air for completing combustion. Baffles 40' on the outermost rows of tubes 5 extend downwardly from drums 3 to points above the level of drums 4. Baffles 41', extending between adjacent rows of tubes in tube banks 5 and 6, serve to direct the products of combustion into active contact with tubes 6, and to prevent short circuiting of the gases in the space between adjacent rows of tubes of the tube banks 5 and 6. Baffles 40' and 41' are preferably supported by lugs 41a, welded to adjacent tubes 5 and 6, respectively. Baffles 42' on the outermost rows of tubes 6, extend from drums 4, upwardly to a point below the level of drums 3, and are preferably secured to and held in place by U-bolts passing around the tubes and through the baffle 42', or by lugs 42a welded to these tubes. Superheaters 24', connected by pipes 23 with the tops of drums 3, may be installed in the triangular space between the baffles 42', the walls 19' and the roofs 19''. The products of combustion, after passing downwardly over the superheaters 24', escape through the openings 20 into the flue 19, under control by the dampers 22.

Pulverized fuel is fed from a hopper 28, supported above the furnace into tubes 29'; at either end of the boiler, by power driven screws 30', right and left hand on either side of median line 6—6 of Fig. 7. The tubes 29' contain air ports 31' for the admission of heated air from the air supply conduits 32', which are in turn supplied by the air supply conduits 35'; connecting with air preheaters in flue 19. These preheaters 19 are however not shown in detail in Fig. 6, since they are similar in character, arrangement and location to the air preheaters 21 in Fig. 1. The air conduits 32', and the fuel tube 29' within it, bend inwardly and upwardly at their lower extremities, and pass through the end walls 10 in such a way as to discharge the fuel, with an initial air supply, upwardly into the combustion chamber, in opposing streams, which, impinging the one against the other, are broken up and intermingled in such a way as to greatly aid the ignition and combustion process, and to cause the resultant stream of gases, after ignition, to flow in an upright course toward the roof of the combustion chamber, where, meeting with a secondary preheated air supply delivered through damper controlled conduits 38', and discharged through openings 2b in the combustion chamber roof, a further admixture of air takes place, and the burning gases are deflected downwardly in streams on either side, along and in partial contact with the tubes 5 of the primary generating elements, and pass under the ends of baffles 40' and 41', thence upwardly in contact with tubes 6 over the top of baffles 42', into the triangular spaces occupied by the superheaters 24', and thence downwardly between walls 19' and baffles 42', to and through openings 20, into flues 19, and thence upwardly, past dampers 22, to the stack or other draft producing means.

It will be apparent to those skilled in the art, that fuel and air discharged from so-called unit pulverizers, can be utilized with my invention in lieu of the fuel and air supplied by the means herein shown and described.

Having described my invention, I claim,

1. A steam generator comprising a combustion chamber having banks of tubes on the opposite sides thereof, drums adjacent to the lower part of said combustion chamber on opposite sides thereof and connected with said banks of tubes, and oppositely inclined tubes connecting the drums aforesaid.

2. A steam generator comprising a combustion chamber, drums on opposite sides of said combustion chamber adjacent to the bottom thereof, generating elements projecting upwardly from the respective drums, a set of tubes having outlets to one of said drums and inlets from the other of said drums, a set of tubes having outlets to said last named drum above the inlets to said first named tubes and inlets from the other of said drums below the outlets of the first named tubes and means for supplying fuel to said combustion chamber.

3. A steam generator comprising a combustion chamber having a hearth, means for discharging products of combustion from the upper portion of said chamber toward said hearth, drums on opposite sides of said chamber adjacent to said hearth, oppositely inclined tubes crossing one another and connecting said drums, parts of tubes aforesaid partially shielding parts of other tubes aforesaid and said hearth from the action of said products of combustion, means for flowing air over said partially shielded parts of said tubes, and upright generating elements extending upwardly from said drums on opposite sides of said combustion chamber.

4. A steam generator comprising a combustion chamber surrounded by heat absorptive water circulating elements and a wall preventing lateral ingress of air to said chamber, means for discharging a stream of fuel and heated air under pressure downward in said combustion chamber, and means for discharging a stream of heated air under pressure into the bottom of said combustion chamber to deflect said descending stream upwardly against said circulating elements.

In witness whereof I have hereunto set my name this 24th day of Nov. 1926.

ALBERT C. WOOD.